United States Patent [19]
Kelley

[11] Patent Number: 5,837,048
[45] Date of Patent: Nov. 17, 1998

[54] FLOWABLE POWDER FOR HIGH TEMPERATURE PLASMA SPRAY COATING APPLICATIONS

[75] Inventor: Kurtis C. Kelley, Washington, Ill.

[73] Assignee: Caterpillar Inc., Peoria, Ill.

[21] Appl. No.: 896,704

[22] Filed: Jul. 18, 1997

[51] Int. Cl.$^6$ ............... C08L 1/28; C08L 1/26; C08K 3/10; C08K 3/34
[52] U.S. Cl. ................... 106/197.01; 106/198.1
[58] Field of Search ............ 106/197.01, 198.1

[56] References Cited

U.S. PATENT DOCUMENTS 5,690,724  11/1997  Hester et al. ................. 106/198.1

Primary Examiner—Peter A. Szekely
Attorney, Agent, or Firm—Kevin M. Kercher

[57] ABSTRACT

This invention relates to a process for making powders for plasma spray coatings from single components and multiple component having dissimilar particle size and density, which can withstand temperatures in excess of 200° C. within a plasma spray gun and still be freely flowable. In this invention a process for enhancing the high temperature flowability of a powder for spray coatings is disclosed. The process includes the following steps. A powder selected from one of a metal, a ceramic, or mixtures thereof is mixed with a blend of polymeric cellulose ether and water to a dough-like consistency. The powder and the blend are mixed in a volumetric ratio in the range of about 90:10 to about 99:1, powder:blend and a paste is formed. The paste is dried. The dry paste is particulated and a flowable powder having a particle size the range of about 50 μm to about 300 μm is formed.

23 Claims, No Drawings

FLOWABLE POWDER FOR HIGH TEMPERATURE PLASMA SPRAY COATING APPLICATIONS

TECHNICAL FIELD

The present invention relates generally to a method for altering surface properties of a powder to improve its flow characteristics, and more particularly to a process for making powders for plasma spray coatings from single components and multiple component having dissimilar particle size and density, which powders can withstand temperatures in excess of 200° C. within a plasma spray gun and still be freely flowable.

BACKGROUND ART

Plasma spray techniques are used to deposit wear resistant or thermally insulating coatings on various components in engines. For example, ceramic powders are plasma sprayed on the face of engine piston crowns and valves to deposit thermal barrier coatings on these components.

The plasma spray technique requires that a coating material be in a powder form, and the powder flow freely through a conduit to a plasma spray gun at a controlled feed rate. The plasma spray gun discharges the powder into a plasma flame at a controlled discharge rate to result in a plasma spray. If the powder does not flow freely, it results in a poor feed rate control to the plasma spray gun and consequently, a poor coating quality.

In most instances, plasma spray coatings are deposited from a multi-component powder mixture. The components often have different chemical properties, particle size and density. Thus, it is difficult to obtain a homogeneous mixture of a multi-component powder that is freely flowable through a conduit. It is also difficult to make a freely flowable powder out of single component powders where the particle size of the component is extremely small because the particles tend to agglomerate in a non-uniform manner.

Various methods for altering the powder flow characteristics are known to the plasma spray coatings industry. For example, the powder mixture can be passed through a sieve to obtain a powder with a narrower particle-size distribution and thus improve flowability. The powder may also be spray dried to agglomerate the powder into spherical particles which flow better. Unfortunately, spray drying is generally limited to fine particle size powder mixtures in which all of the mixture components are of similar size and density.

All of the above problems are further compounded by the fact that in certain coating applications, the plasma spray powder is exposed to temperatures well in excess of 200° C. within a plasma spray gun. At these temperatures, the plasma powder tends to get sticky and clump up within the gun.

It has been desirable to have a process for improving the flowability of multi-component powder mixtures where the various powder components have significantly dissimilar density and particle size. It has also been desirable to have a process for improving the flowability of single component powders where the component has extremely small particle size, for example, in the nanometer size range. It is extremely desirable that ever surface property alteration is done to improve the flowability of the powder, it be such that the powder can withstand exposure to temperatures well in excess of 200° C. within a plasma spray gun and still not get sticky and cloggy. This high temperature stability and flowability of a plasma spray powder is the thrust of this invention.

The present invention is directed to overcome one or more problems of heretofore utilized methods for making a freely flowable powder mixture for plasma spray coating applications.

DISCLOSURE OF THE INVENTION

In one aspect of the present invention, a process for enhancing the high temperature flowability of a powder for spray coatings is disclosed. The process includes the following steps. A powder selected from one of a metal, a ceramic, or mixtures thereof is mixed with a blend of polymeric cellulose ether and water. The blend has a dough-like consistency. The polymeric cellulose ether has a general formula;

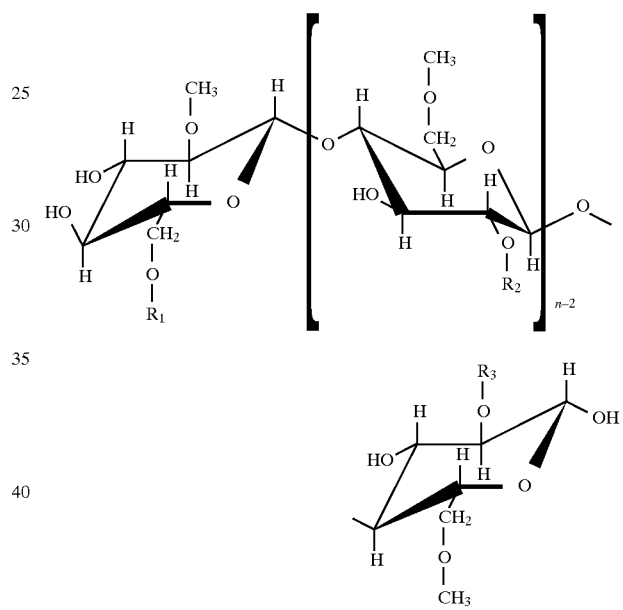

$R_1$ is selected from the group consisting of $CH_3$ and $CH_2CH(OH)CH_3$; $R_2$ is selected from the group consisting of $CH_3$ and $CH_2CH(OCH_3)CH_3$; $R_3$ is selected from a group consisting of H and $CH_3$; and the value of n is at least 100. The powder and the blend are mixed in a volumetric ratio in the range of about 90:10 to about 99:1, powder:blend and a paste is formed. The paste is dried. The dry paste is particulated and a flowable powder having a particle size the range of about 50 μm to about 300 μm is formed.

In another aspect of the present invention, a high temperature resistant flowable powder composition for plasma spray is disclosed. The composition comprises a powder selected from one of a metal, a ceramic, or mixtures thereof. The composition also comprises a polymeric cellulose ether having a general formula;

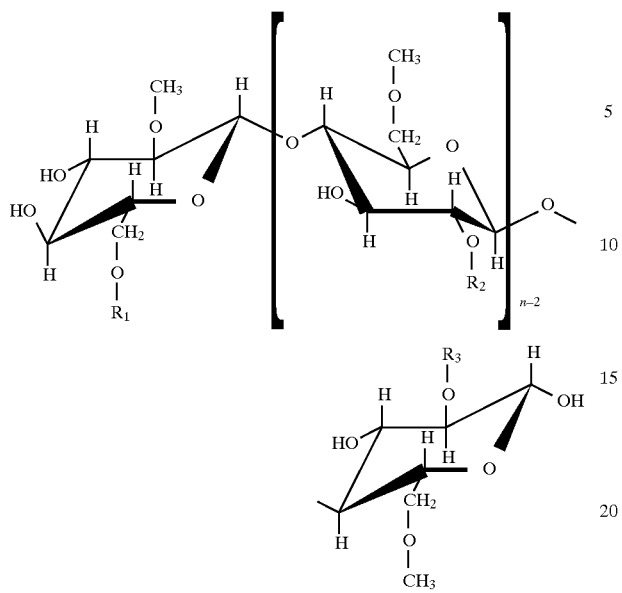

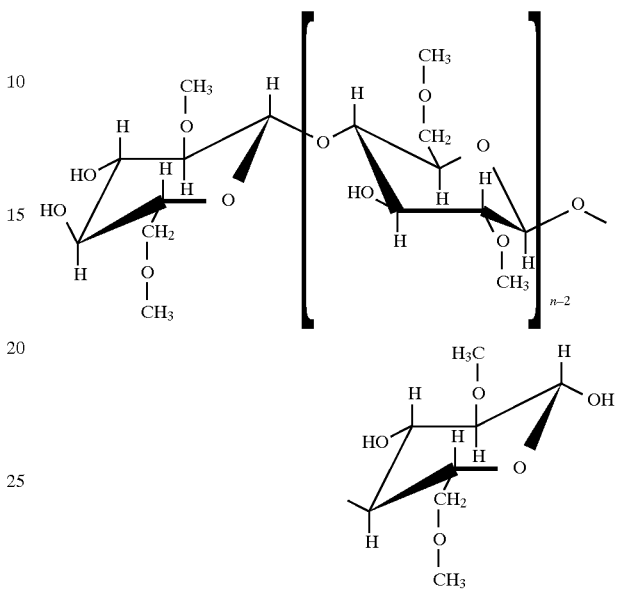

$R_1$ is selected from the group consisting of $CH_3$ and $CH_2CH(OH)CH_3$; $R_2$ is selected from the group consisting of $CH_3$ and $CH_2CH(OCH_3)CH_3$; $R_3$ is selected from a group consisting of H and $CH_3$; and the value of n is at least 100. The powder and the polymeric cellulose ether are present in a volumetric ratio in the range of about 90:10 to about 99:1, powder:polymeric cellulose ether. The flowable powder has a particle size in the range of about 50 μm to about 300 μm.

BEST MODE FOR CARRYING OUT THE INVENTION

The terms "flowable", "freely flowable" and "flowability" as used herein are meant to describe a flow characteristic of a powder used for spray coating applications. A flowable powder flows freely through a conduit without the aid of additional flow enhancing steps such as fluidizing, for example. However, one skilled in the art may use known fluidizing techniques to further aid in the flowability of the powder. Likewise, one skilled in the art may use known gravity flow methods to aid in the flowability of the powder. The term "high temperature", as used herein, means temperature in excess of about 200° C. but less than about 280° C.

In the preferred embodiment of the present invention, a process for enhancing the high temperature flowability of a powder for spray coatings is disclosed. The process includes the following steps. A powder selected from one of a metal, a ceramic, or mixtures thereof is mixed with a blend of polymeric cellulose ether and water. The blend has a dough-like consistency. The powder and the blend are mixed in a volumetric ratio in the range of about 90:10 to about 99:1, powder:blend and a paste is formed. The paste is dried. The dry paste is particulated and a flowable powder having a particle size the range of about 50 μm to about 300 μm is formed.

In the preferred embodiment of the present invention, the value of n is desirably at least 100, preferably in the range of about 2000 to about 8000, and even more preferably, about 5200. A value less than 100 is undesirable because the molecular weight of the polymer will be too low, detrimentally resulting in too low a viscosity of the powder-polymeric cellulose ether blend and a consequential reduction in the binding action of the polymeric cellulose ether.

Preferably, the value of n is greater than about 2000 and less than 5000 to preserve a "dough-like" consistency of the paste.

Alternatively, a powder may be blended with polymeric hydroxypropyl methylcellulose ether having a general formula;

or other cellulose ether compounds having a polymer backbone of cellulose which are water soluble and are capable of thermal gellation. Such cellulose ether compounds are ones made by the treatment of cellulose fibers with a caustic solution treated with methyl chloride, and/or propylene oxide.

The polymeric cellulose ether:water gravimetric ratio is desirably between 9:91 to 1:99, and preferably between 7:93 and 1:99. In the best mode, this ratio is 3:97. A polymeric cellulose ether content in the ether:water blend less than 1:99 is undesirable because there is very little binding action of the ether and a dough-like consistency of the resultant blend will not be obtained. A polymeric cellulose ether content in the ether:water blend greater than 9:91 is undesirable because not only will the dough-like consistency not be obtained, but the excess polymeric cellulose ether would have to be ignited when the plasma powder is introduced into a plasma flame and this will detrimentally affect coating quality. About a 3% by weight polymeric cellulose ether in water solution is preferred because it represents an amount of ether suitable for most powders used for plasma spray applications, in terms of its ability to coat the surface area of such powders and make the resultant powder free flowing.

In the preferred embodiment of the present invention, the powder and ether-water blend are mixed in a volumetric ratio ranging desirably, from about 90:10 to about 99:1 powder:ether-water blend and preferably in the range of about 95:5 to about 99:1. This ratio is in the range of about 97:3 to about 98:2 in the best mode. A volume ratio of powder:polymeric ether-water greater than 99:1 is undesirable because the polymeric cellulose ether will not be present in an amount sufficient to impart any surface modification characteristics to the powder particles or bond particles together to form micro agglomerates that are essential to make the powder flowable. A volume ratio of powder:ether-water blend less than 90:10 is undesirable because the polymeric cellulose ether will be present in too large a quantity and will detrimentally affect the coating during plasma spray by flashing off and igniting during deposition.

In the preferred embodiment of the present invention, the powder and polymeric cellulose ether in water blend are mixed to a homogeneous dough-like consistency. A paste of dough like consistency is desirable because the paste must be thick enough to contain only a minimum amount of solution, so that all the powder particles are fully wetted but that no solution separates from the mixture after the paste is allowed to sit in a container. If the paste is too wet, the polymeric celluose ether-water solution will rise to the surface of the paste and form a thin film over it. When dried and pulverized, this cellulose ether film can detrimentally affect the coating quality when the powder is fed to a plasma spray gun and coated. If the paste is too dry, adequate surface wetting of all particles will not occur, detrimentally affecting the flowability of the resultant powder.

In the preferred embodiment of the present invention, the paste is dried at a temperature in the range of 50° C. to 100° C. Desirably, the paste is dried at a temperature in the range of about 50° C. to 85° C., and preferably, at about 60° C. A drying temperature less than about 50° C. is undesirable because it would result in too long a drying time and represent a waste of time.

In the preferred embodiment of the present invention, the dry paste is particulated to form a flowable powder having a particle size desirably, in the range of about 75 μm to about 250 μm, even more desirably, in the range of about 100μm to about 200 μm, and preferably, about 150 μm. A particle size less than about 75 μm is undesirable because the particles would be too small and would not flow too well in a plasma spray equipment, such as a conduit feeding the plasma spray powder mixture to a gun, for example. A particle size greater than about 250 μm is not desirable because the particles would bee too large and would not be suitable for injection into a plasma flame, thus detrimentally affecting coating quality.

The polymeric cellulose ether used is hydroxypropyl methylcellulose ether, manufactured by Dow Chemical Co., having a trade name "METHOCEL 20-231" and a thermal gellation temperature of about 40° C. at a 2.5% weight concentration in water. An alternate polymeric cellulose ether is manufactured by Dow Chemical Co. and has a trade name "METHOCEL A4M".

INDUSTRIAL APPLICABILITY

The present invention is useful for making high temperature resistant freely flowable powders for plasma spray coatings from single and multi-component powder mixtures having dissimilar particle size and density. This invention is particularly useful for improving the flowability of mixtures of amorphous powders and crystalline powders, for example, which have vastly dissimilar surface tension and wettability properties, density, and particle size. The freely flowable powders made by the process of the present invention can be used to feed a plasma spray gun, with a significant improvement in powder compositional and flow rate consistency, resulting in higher quality coatings. Further, and most importantly, the powders made in the manner described in this invention will withstand gun temperatures in excess of 200° C. without getting stick and clogging the gun. The polymeric cellulose ether which makes the powder flowable will generally spontaneously decompose during the thermal spray deposition between the temperatures of 282° C. to 318° C.

Other aspects, objects and advantages of this invention can be obtained from a study of the disclosure and the appended claims.

I claim:
1. A process for enhancing the high temperature flowability of a powder for spray coatings, comprising the steps of:
   mixing a metal, ceramic, or mixtures thereof powder with a blend of polymeric cellulose ether and water, said blend having a dough-like consistency, said polymeric cellulose ether having a general formula;

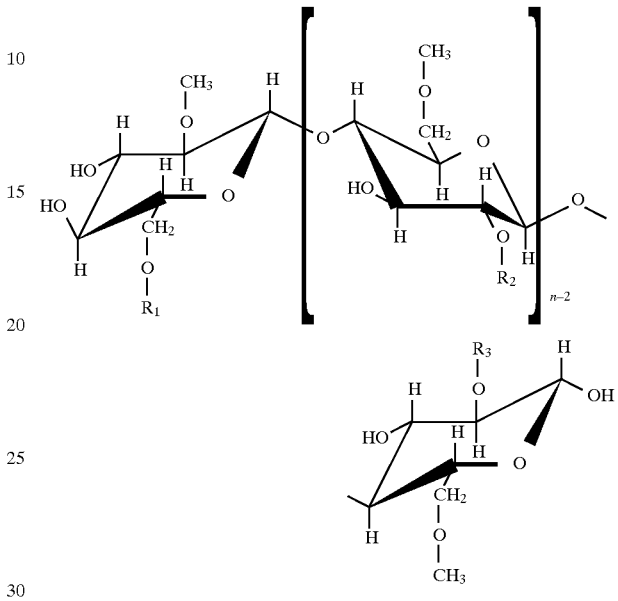

wherein $R_1$ is selected from the group consisting of $CH_3$ and $CH_2CH(OH)CH_3$; $R_2$ is selected from the group consisting of $CH_3$ and $CH_2CH(OCH_3)CH_3$; $R_3$ is selected from a group consisting of H and $CH_3$; and the value of n is at least 100, and said powder and said blend being mixed in a volumetric ratio in the range of about 90:10 to about 99:1, powder:blend;
forming a paste of said powder-blend mixture;
drying said paste; and
particulating said dry paste and forming a flowable powder having a particle size in the range of about 50 μm to about 300 μm.

2. A process, as set forth in claim 1, wherein said blend of polymeric cellulose ether and water has a gravimetric composition in the range of about 9:91 to about 1:99, polymeric cellulose ether:water.

3. A process, as set forth in claim 2, wherein said blend of polymeric cellulose ether and water has a gravimetric composition in the range of about 7:93 to about 1:99, polymeric cellulose ether:water.

4. A process, as set forth in claim 3, wherein the weight ratio of the blend of polymeric cellulose ether and water is 3:97, polymeric cellulose ether:water.

5. A process, as set forth in claim 1, wherein said powder and said polymeric cellulose ether-water blend are mixed in a volumetric ratio in the range of from about 95:5 to about 99:1, powder:polymeric cellulose ether-water blend.

6. A process, as set forth in claim 5, wherein said powder and said polymeric cellulose ether-water blend are mixed in a volumetric ratio in the range of from about 97:3 to about 98:2, powder:polymeric cellulose ether-water blend.

7. A process, as set forth in claim 1, wherein said powder and said polymeric cellulose ether-water blend are mixed to form a homogeneous paste.

8. A process, as set forth in claim 1, wherein $R_1$ is $CH_3$; $R_2$ is $CH_3$; and $R_3$ is $CH_3$.

9. A process, as set forth in claim 1, wherein $R_1$ is $CH_2CH(OH)CH_3$; $R_2$ is $CH_2CH(OCH_3)CH_3$; and $R_3$ is H.

10. A process, as set forth in claim 1, wherein the value of n is in the range of from about 2000 to about 8000.

11. A process, as set forth in claim 10, wherein the value of n is in the range of from about 4000 to about 6000.

12. A process, as set forth in claim 1, wherein said paste is dried at a temperature in the range of about 50° C. to about 100° C.

13. A process, as set forth in claim 11, wherein said paste is dried at a temperature of about 60° C.

14. A process, as set forth in claim 1, wherein said dry paste is particulated to form a flowable powder having a particle size in the range of about 75 μm to about 250 μm.

15. A high temperature resistant flowable powder composition for plasma spray, comprising:

a powder selected from one of a metal, a ceramic, or mixtures thereof;

polymeric cellulose ether having a general formula;

wherein $R_1$ is selected from the group consisting of $CH_3$ and $CH_2CH(OH)CH_3$; $R_2$ is selected from the group consisting of $CH_3$ and $CH_2CH(OCH_3)CH_3$; $R_3$ is selected from a group consisting of H and $CH_3$; and the value of n is at least 100;

said powder and said polymeric cellulose ether being present in a volumetric ratio in the range of about 90:10 to about 99:1, powder:polymeric cellulose ether; and said flowable powder having a particle size in the range of about 50 μm to about 300 μm.

16. A flowable powder composition, as set forth in claim 15, wherein said powder and said polymeric cellulose ether are present in a volumetric ratio in the range of from about 95:5 to about 99:1, powder:polymeric cellulose ether.

17. A flowable powder composition, as set forth in claim 16, wherein said powder and said polymeric cellulose ether are present in a volumetric ratio in the range of from about 97:3 to about 98:2, powder:polymeric cellulose ether.

18. A flowable powder composition, as set forth in claim 15, wherein $R_1$ is $CH_3$; $R_2$ is $CH_3$; and $R_3$ is $CH_3$.

19. A flowable powder composition, as set forth in claim 15, wherein $R_1$ is $CH_2CH(OH)CH_3$; $R_2$ is $CH_2CH(OCH_3)CH_3$; and $R_3$ is H.

20. A flowable powder composition, as set forth in claim 15, wherein the value of n is in the range of from about 2000 to about 8000.

21. A flowable powder composition, as set forth in claim 20, wherein the value of n is in the range of from about 4000 to about 6000.

22. A flowable powder composition, as set forth in claim 15, wherein said flowable powder has a particle size in the range of about 75 μm to about 250 μm.

23. A flowable powder composition, as set forth in claim 15, wherein said flowable powder can flow freely in a plasma spray gun even said powder is exposed to a temperature in the range of 200° C. to 250° C. within said gun.

* * * * *